United States Patent [19]

Kasahara et al.

[11] Patent Number: 5,262,182
[45] Date of Patent: Nov. 16, 1993

[54] BREADMAKING DOUGH CONDITIONER

[75] Inventors: Akira Kasahara, Okegawa; Koji Takeya, Sakura; Hiroshi Takeshima, Funabashi; Ryuji Uemura, Tokyo, all of Japan

[73] Assignee: Nisshin Flour Milling Co., Ltd., Tokyo, Japan

[21] Appl. No.: 923,476

[22] Filed: Aug. 3, 1992

[30] Foreign Application Priority Data

Aug. 14, 1991 [JP] Japan ................. 3-228684

[51] Int. Cl.⁵ .............................. A21D 2/24
[52] U.S. Cl. .......................... 426/19; 426/23; 426/24; 426/25; 426/26; 426/62; 426/653
[58] Field of Search ............ 426/653, 23, 24, 25, 426/26, 19, 62

[56] References Cited

U.S. PATENT DOCUMENTS 4,296,133 10/1981 Tanaka et al. .
4,405,648 9/1983 Atsumi et al. .
4,500,551 2/1985 Tanaka et al. .

FOREIGN PATENT DOCUMENTS 63-152935 6/1988 Japan .

Primary Examiner—Joseph Golian
Attorney, Agent, or Firm—Oblon, Spivak, McClelland, Maier & Neustadt

[57] ABSTRACT

A breadmaking dough conditioner is disclosed which comprises (a) an ascorbic acid, (b) at least one amino acid or salts thereof selected from the group consisting of cystine, methionine, asparagic acid, alanine, glycine and salts thereof, (c) an alum and (d) at least one emulsifier selected from the group consisting of a glycerol fatty acid monoester and a sucrose fatty acid ester having an HLB value of 5 to 10. The dough conditioners are especially suitable for the manufacture of bread using a frozen or chilled bread dough. They can prepare breads which have no fisheyes on the surface of the baked bread, have large bread volume and are good in all respects of appearance, inner phase, taste and flavor.

5 Claims, No Drawings

BREADMAKING DOUGH CONDITIONER

FIELD OF THE INVENTION

This invention relates to breadmaking dough conditioners which are especially suitable for the production of bread using a frozen or chilled bread dough and also to breadmaking wheat flour compositions comprising said conditioner.

BACKGROUND OF THE INVENTION

In general, bread has been made through many steps of charging ingredients, mixing, first fermentation, division, benching, molding, final proofing and baking or frying in oil. Such breadmaking requires a long time, usually about 2 to 7 hours over a period from charge of ingredients to baking. To save time and labor in bakeshops, demand for a frozen or chilled bread dough has been increasing in recent years. In that case, the frozen or chilled dough can be supplied to bakeshops by a large-scale breadmaking factory in a cold chain system. The bakeshops can subject such frozen or chilled dough to final proof and baking to serve timely a consumer with delicious bread hot from an oven.

However, the frozen or chilled bread doughs suffer from the disadvantages that there occurs in a baked bread a white blister-like spot which is called "fisheyes" and there is insufficient swelling of bread which leads to reduced volume of bread. Such fisheyes often occur especially in a lean bread containing lesser amounts of sugars, oils and fats or the like, such as French bread. The baked products having fisheyes are unpleasant in appearance which results in much reduced commercial value. Those fisheyes are particularly evident in case where a dough is frozen and subsequently chilled or in case where a dough is only chilled.

Now it has been proposed to incorporate glycerol fatty acid esters and/or esters of glycerol fatty acid esters with organic acids into a chilled bread dough for preventing fisheyes from the occurrence in a baked product (Japanese Patent Kokai 63-152935). This process may provide lesser occurrence of fisheyes but has the drawbacks of insufficient bread swelling leading to reduced volume of bread.

SUMMARY OF THE INVENTION

We have made extensive studies in an effort to overcome such disadvantages of the prior art and found that bread of extremely good quality (no occurrence of fisheyes, increased volume of bread, good in all aspects of appearance, inner phase, outer phase, texture, taste and flavor, etc.) can be produced by using in a dough ready for baking (e.g. frozen and/or chilled bread dough) a dough conditioner comprising a combination of an ascorbic acid, a specific amino acid or its salts, an alum and a specific emulsifier.

Thus the present invention provides a breadmaking dough conditioner which comprises (a) an ascorbic acid, (b) at least one amino acid or salts thereof selected from the group consisting of cystine, methionine, asparagic acid, alanine, glycine and salts thereof, (c) an alum and (d) at least one emulsifier selected from the group consisting of a glycerol fatty acid monoester and a sucrose fatty acid ester having an HLB value of 5 to 10. The dough conditioner is especially suitable for the production of breads using a frozen and/or chilled dough.

The invention also provides a breadmaking wheat flour composition containing four components of (a) to (d). Further, the invention provides a process of freezing and/or chilling a dough which is prepared by using the dough conditioner prior to final proof and it also provides a frozen and/or chilled bread dough produced by the process.

DESCRIPTION OF THE INVENTION

The term "an ascorbic acid" as used herein means to include L-ascorbic acid, dehydroascorbic acid or salts thereof. The ascorbic acid as component (a) can be used alone or in combination.

The amino acids or salts thereof as component (b) are selected from any of cystine, methionine, asparagic acid, alanine, glycine or salts thereof, which can be used alone or in combination.

The alums as component (c) include potassium alum, ammonium alum, burnt alum or the like.

The emulsifiers as component (d) include glycerol fatty acid monoesters and sucrose fatty acid esters having an HLB value of 5 to 10, which can be used alone or in combination. The glycerol fatty acid monoesters are the ester wherein one hydroxyl group in the glycerol is esterified with a saturated or unsaturated fatty acid. The sucrose fatty acid esters are required to have the HLB (Hydrophile-Lypophile Balance) of 5 to 10. The HLB beyond the range of 5 to 10 gives less effect to prevent the occurrence of fisheyes and provides reduced volume of bread.

The breadmaking dough conditioners of the invention can be prepared by mixing four components of (a) to (d) together. Preferably, four components can be mixed so as to give the weight ratio of (a):(b):(c):(d) being about 1-15: about 1-100: about 1-200: about $15 \times 10^2 - 80 \times 10^2$, respectively. The conditioners thus prepared may be stored, distributed and sold, independent of wheat flour for breadmaking.

In the production of breads using the bread conditioners of the present invention, the ascorbic acids as component (a) may be added in a proportion of about 1 to 15 ppm and preferably 3 to 8 ppm, the amino acids or salts thereof as component (b) in a proportion of about 1 to 100 ppm and preferably about 10 to 60 ppm, the alums as component (c) in a proportion of about 1 to 200 ppm and preferably 10 to 60 ppm and the emulsifiers as component (d) in a proportion of about 1500 to 8000 ppm (0.15 to 0.8%) and preferably 2000 to 5000 ppm (0.2 to 0.5%), all proportions being based on the weight of starting wheat flour for breadmaking. By this manner can be produced a bread with no occurrence of fisyeyes and having large volume and good taste and flavor.

To provide easy and uniform incorporation of the dough conditioner into starting wheat flour for breadmaking, it is preferable to add in advance to said conditioner dilutents which include starch; wheat flour and other meals; powders of beans; powders of dairy products such as nonfat dry milk, whole fat dry milk, cheese powder, yogurt powder, whey powder or the like. Preferably, the diluents may be used in a proportion of about 5 to 4000 times based on the total weight of components (a) to (d).

The dough conditioner of the invention may contain other additives such as ammonium chloride, calcium carbonate, calcium sulfate, calcium hydrogenphosphate, enzyme or the like.

As mentioned above, the present invention also includes the breadmaking wheat flour composition containing four components of (a) to (d). In the preparation of the wheat flour composition, the dough conditioner having four components of (a) to (d) incorporated therein may be incorporated into the starting wheat flour for breadmaking. Alternatively, four components of (a) to (d) may be added separately to the starting wheat flour for breadmaking. It is convenient to employ the dough conditioner containing four components because of no need of measuring components (a) to (d) separately and adding each component on breadmaking. The amount of each component added to the wheat flour composition is preferably in the range as indicated above. The wheat flour composition may contain, in addition to components (a) to (d), other ingredients conventionally used in the manufacture of bread, e.g., yeast, fats and oils, sugars, dairy products, salt, yeast food.

In the manufacture of breads using the dough conditioner of the present invention, breads may be produced under usual condition according to a straight dough method or a sponge-and-dough method. The dough conditioner of the invention can be added on charge of all ingredients when the straight dough method is employed and on charge of a sponge when the sponge dough method is employed, so that which the dough conditioner can be mixed uniformly and breads of good quality can be obtained.

The dough conditioners of the present invention can be used in the manufacture of any bread which includes a lean bread containing lower amount of fats and oils, sugars or the like, a rich bread containing higher amount of fats and oils, sugars or the like, and breads through or not through the steps of chilling and freezing. The present conditioners are particularly suitable for the manufacture via the steps of chilling and/or freezing of lean breads such as French bread, French style country bread (pain de campagne), pullman bread, kaiser roll, rolls.

In the production of breads through the steps of chilling and/or freezing, the process comprises the steps of incorporating the dough conditioner of the present invention into wheat flour together with yeast and other additives for breadmaking, mixing the ingredients to form a dough according to the straight dough method or the sponge-and-dough method, and subjecting the dough to first fermentation, dividing, benching, molding and chilling and/or freezing to prepare a chilled or frozen dough.

The term "frozen" as used herein means that the interior of the dough reaches the frozen state or the dough is frozen to a temperature usually less than about −10° C., especially less than −15° C. The term "chilled" as used herein means that the dough does not reach the frozen state or the dough is chilled to a temperature usually in the range of −5° C. to 10° C.

According to the present invention, the molded dough can be stored, distributed and sold in such a state that it is frozen prior to final proof, in such a state that it is frozen once and chilled prior to final proof or in a chilled state prior to final proof without any freezing. In that case, the molded dough may be packed before or after freezing and/or chilling.

Each retail bakeshop and each home can buy the frozen or chilled dough, store it in a freezer or a refrigerator, take it out when needed and then give it to final proof and baking or frying in oil, so that a delicious bread hot from the oven can be made in a very simple manner and in a short time.

The following examples are illustrative of the invention. Unless otherwise indicated, all parts are by weight and temperatures are in degrees centigrade.

EXAMPLES 1-5 & COMPARATIVE EXAMPLES 1-5

French breads were produced under the following breadmaking conditions according to the straight dough method, by adding to the dough formula shown in Table 1 the breadmaking dough conditioners consisting of the components shown in Table 2 in which the proportions of the components (a) to (d) used are expressed in ppm based on the weight of wheat flour for breadmaking.

TABLE 1

| Dough Formula | |
| --- | --- |
| Wheat flour* | 100 parts |
| Yeast** | 0.8 part |
| Malt extract*** | 0.4 part |
| Salt | 2 parts |
| Water | 65 parts |
| Dough Conditioner (proportions and components as shown in Table 2) | |

*"Soledol", Nisshin Flour Milling Co., Ltd.
**"Instant Dry Yeast", S. I. Lesaffre, 59703 Marcq France
***"Malt Ace", Oriental Yeast Co., Ltd.

BREADMAKING CONDITIONS

Mixing: 2 minutes low (94 rpm), 7 minutes medium (175 ppm)
Dough Temperature: 26°-27° C.
First Fermentation: 120 minutes at 27° C. and 75% humidity
Dividing: 300 g/piece
Bench Time: 25 minutes at room temperature
Molding: Mold the bread into a length of about 30 cm by flattening the dough and thus removing the gas.
Freezing: 24 hrs. at −20° C.
Chilling: 15 hrs. at 4° C.
Final Proof: 60 minutes at 32° C. and 80% humidity
Baking: 35 minutes at 220° C. in the oven The weight and volume of the baked French breads were measured. The qualities of the breads were evaluated by ten panellers and rated using the following scale. The results are averaged and shown in Table 2.

EVALUATION OF BREAD AND QUALITY

Appearance of Bread

5 . . . Large volume and good "coupe" (diagonal cut provided across the top surface of the bread)
4 . . . Slightly large volume and slightly good "coupe"
3 . . . Regular volume and regular "coupe"
2 . . . Slightly small volume and slightly poor "coupe"
1 . . . Small volume and poor "coupe"

Outer Phase

5 . . . Very smooth, glossy crust
4 . . . Smooth, glossy crust
3 . . . Smooth crust
2 . . . Slightly gritty crust
1 . . . Very gritty crust Fisheyes 5 . . . Nothing
4 . . . Trace 3 ... Few
2 ... Many
1 ... Great many

Inner Phase

5 ... Very thin cell wall with very good extensibility
4 ... A little thin cell wall with good extensibility
3 ... Slightly thin cell wall with slightly good extensibility
2 ... Slightly thick cell wall with slightly poor extensibility
1 ... Thick cell wall with poor extensibility

Taste-Flavor

5 ... Very good taste and flavor
4 ... Good taste and flavor
3 ... Slightly good taste and flavor
2 ... Slightly undesirable taste
1 ... Undesirable taste

Overall Evaluation o ... Above 3 marks in each item
x ... Including less than 3 marks in any item

TABLE 2

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Ingredient of dough conditioner (ppm) | | | | | | | | | | |
| L-ascorbic acid | 5 | 5 | 5 | 5 | 8 | — | 5 | 5 | 5 | 30 |
| Cystine | 30 | 30 | 1 | 15 | 15 | 30 | 30 | — | 30 | — |
| Burnt alum | 30 | 1 | 30 | 30 | 15 | 30 | — | 30 | 30 | — |
| Glycerol fatty acid monester* | 3000 | 3000 | 3000 | 3000 | 5000 | 3000 | 3000 | 3000 | — | 3000 |
| Quality of Bread | | | | | | | | | | |
| Weight (g) | 229 | 227 | 232 | 231 | 228 | 228 | 230 | 233 | 229 | 232 |
| Volume (cc) | 1240 | 1335 | 1365 | 1300 | 1345 | 1245 | 1180 | 1190 | 1260 | 787 |
| Specific volume | 5.4 | 5.9 | 5.9 | 5.6 | 6.1 | 5.5 | 5.1 | 5.1 | 5.5 | 3.4 |
| Appearance of bread | 4 | 4 | 4 | 3 | 4 | 4 | 2 | 2 | 4 | 1 |
| Outer Phase | 4 | 4 | 4 | 4 | 4 | 4 | 4 | 4 | 1 | 1 |
| Fisheyes | 4 | 3 | 5 | 5 | 3 | 2 | 5 | 5 | 1 | 1 |
| Inner Phase | 4 | 3 | 3 | 3 | 4 | 4 | 3 | 3 | 3 | 1 |
| Taste · Flavor | 4 | 4 | 4 | 4 | 4 | 4 | 4 | 4 | 5 | 1 |
| Overall evaluation | o | o | o | o | o | x | x | x | x | x |

*EMULSI MM 100 produced by Riken Vitamin Co., Ltd.

From the data in Table 2, it is evident that the breads produced in Examples 1-5 using the dough conditioner of the present invention are of large volume, a little or little fisheyes and are good in all respects of the appearance of bread, outer phase, inner phase, taste and flavor. On the other hand, the breads produced in Comparative Examples 1-5 lacking in one or more than two of the ingredients (a) to (d) are of smaller volume than those of Examples 1-5, not expanded well and found to be poor in the quality of bread which was evaluated by less than 3 marks in one or more than two items of the appearance, outer phase, fisheyes, inner phase, taste and smell.

EXAMPLE 6

French bread with the following quality was prepared in the same manner as in Example 1, but using the dough conditioner comprising the ingredients shown in Table 3.

TABLE 3

|  | A | B | C | D | E |
| --- | --- | --- | --- | --- | --- |
| Ingredient of dough conditioner (ppm) | | | | | |
| L-ascorbic acid | 5 | 20 | 5 | 1 | 15 |
| Cystine | 30 | 30 | 30 | 100 | 5 |
| Burnt alum | 30 | 30 | 250 | 200 | 5 |
| Glycerol fatty acid monoester* | 3000 | 3000 | 3000 | 10000 | 1000 |
| Quality of Bread | | | | | |
| Weight (g) | 229 | 229 | 229 | 226 | 227 |
| Volume (cc) | 1240 | 1370 | 1275 | 1345 | 1450 |
| Specific volume | 5.4 | 6.0 | 5.6 | 6.0 | 6.4 |
| Appearance of bread | 4 | 4 | 3 | 2 | 3 |
| Outer phase | 4 | 4 | 4 | 1 | 2 |
| Fisheyes | 4 | 2 | 2 | 5 | 2 |
| Inner phase | 4 | 3 | 3 | 3 | 4 |
| Taste · Flavor | 4 | 4 | 4 | 3 | 4 |

*EMULSI MM 100 produced by Riken Vitamin Co., Ltd.

EXAMPLES 7-13 & COMPARATIVE EXAMPLE 6

French breads were prepared in the same manner as in Examples 1-5, but adding the dough conditioner comprising the ingredients shown in Table 4 to the dough formula shown in Table 1 and used in Examples 1-5, mixing at low rate (94 rpm) for one minute, at middle rate (175 rpm) for 4 minutes and at high rate (287 rpm) for 2 minutes and freezing at −20° C. for 2 hours.

TABLE 4

|  | Example | | | | | | | Comparative Example |
| --- | --- | --- | --- | --- | --- | --- | --- | --- |
|  | 7 | 8 | 9 | 10 | 11 | 12 | 13 | 6 |
| L-ascorbic acid | 5 | 5 | 5 | 5 | 5 | 5 | 5 | 5 |
| Amino acid | 30 | | | | | 30 | 30 | 30 |
| Cystine | | | | | | | | |
| Methionine | | 30 | | | | | | |
| Aspartic acid | | | 30 | | | | | |
| Alanine | | | | 30 | | | | |
| Glycine | | | | | 30 | | | |
| Ammonium alum | 30 | 30 | 30 | 30 | 30 | 30 | 30 | 30 |
| Emulsifier | 3000 | 3000 | 3000 | 3000 | 3000 | | | |

TABLE 4-continued

| | Example | | | | | | | Comparative Example |
|---|---|---|---|---|---|---|---|---|
| | 7 | 8 | 9 | 10 | 11 | 12 | 13 | 6 |
| Glycerol fatty acid monoester*1 | | | | | | | | |
| Sugar fatty acid ester (HLB5)*2 | | | | | 3000 | | | |
| Sugar fatty acid ester (HLB9)*3 | | | | | | 3000 | | |
| Sugar fatty acid ester (HLB11)*4 | | | | | | | 3000 | |

*1 EMULSI MM 100 produced by Riken Vitamine Co., Ltd.
*2 RYOTO SUGAR ESTER S 570 produced by Mitsubishi Chemical Co., Ltd.
*3 RYOTO SUGAR ESTER S 970 produced by Mitsubishi Chemical Co., Ltd.
*4 RYOTO SUGAR ESTER S 1170 produced by Mitsubishi Chemical Co., Ltd.

The quality of the baked French breads was evaluated in the same manner as in Examples 1-5 with the results shown in Table 5.

TABLE 5

| | Example | | | | | | | Comparative Example |
|---|---|---|---|---|---|---|---|---|
| | 7 | 8 | 9 | 10 | 11 | 12 | 13 | 6 |
| Weight (g) | 224 | 228 | 227 | 232 | 231 | 231 | 231 | 233 |
| Volume (cc) | 1385 | 1315 | 1425 | 1400 | 1415 | 1425 | 1370 | 1325 |
| Specific volume | 6.2 | 5.8 | 6.3 | 6.0 | 6.1 | 6.2 | 5.9 | 5.7 |
| Appearance of bread | 5 | 5 | 4 | 4 | 4 | 5 | 5 | 3 |
| Outer Phase | 4 | 4 | 5 | 5 | 5 | 5 | 4 | 2 |
| Fisheyes | 4 | 4 | 5 | 5 | 5 | 5 | 4 | 1 |
| Inner Phase | 4 | 4 | 5 | 5 | 3 | 5 | 4 | 4 |
| Taste · Flavor | 4 | 5 | 4 | 5 | 4 | 4 | 4 | 5 |
| Overall evaluation | o | o | o | o | o | o | o | x |

EXAMPLES 14 & COMPARATIVE EXAMPLE 7

In Example 14, pullman brad was produced under the following breadmaking conditions according to the sponge-and-dough method using the breadmaking formula shown in Table 6.

In Comparative Example 7, pullman bread was produced by the same way as in Example 14, but using 0.1 part of C Oriental Food manufactured by Oriental Yeast Co., Ltd. (20% ammonium chloride, 20% calcium sulfate, 0.6% L-ascorbic acid, 20% calcium carbonate, 39.4% starch) instead of the dough conditioner indicated in Table 6.

TABLE 6

| Breadmaking Formula | | |
|---|---|---|
| | Sponge | Dough |
| Wheat flour* | 70 parts | 30 parts |
| Yeast | 2 parts | |
| Sugar | | 5 parts |
| Salt | | 2 parts |
| Nonfat dry milk | | 2 parts |
| Shortening | | 5 parts |
| Water | 40 parts | 20 parts |
| Dough conditioner** | | 0.3065 part |

*"Camellia" manufactured by Nisshin Flour Milling Co., Ltd.
**Dough conditioner having the following composition: 5 ppm L-ascorbic acid, 30 ppm cystine, 30 ppm burnt alum and 3000 ppm glycerol fatty acid ester ("Emulsi" MM100 manufactured by Riken Vitamin Co., Ltd.)

BREADMAKING CONDITIONS

Sponge

Mixing: 2 minutes low (94 rpm), 2 minutes medium (175 ppm)
Dough Temperature: 24° C.
Sponge Fermentation: 240 minutes at 27° C. and 75% humidity.

Dough

Mixing: 2 minutes low (94 rpm), 7 minutes medium (175 ppm), add shortening, further 2 minutes low (94 rpm), 10 minutes medium (175 rpm)
Dough Temperature: 27° C.
Floor Time: 20 minutes at room temperature
Dividing: 215 g/piece
Bench Time: 20 minutes at room temperature
Molding: Form the dough into a U-shape when it comes out of the molder (place 4 pieces in the pan)
Freezing: 24 hrs. at −20° C.
Chilling: 15 hrs. at 4° C.
Final Proof: 60 minutes at 37° C. and 80% humidity
Baking: 40 minutes at 200° C.

The weight and volume of the baked pullman breads were measured. The qualities of the breads were evaluated by ten panellers and rated using the following scale. The results were averaged and shown in Table 7.

EVALUATION OF BREAD QUALITY

Appearance of Bread

5 ... Large volume, good pile stretching
4 ... Slightly large volume, slightly good pile stretching
3 ... Regular volume, ordinary pile stretching
2 ... Slightly small volume, slightly poor pile stretching
1 ... Small volume, poor pile stretching

Outer Phase

5 ... Smooth surface with evenness
4 ... Smooth surface with slight unevenness
3 ... Normal surface
2 ... Slightly uneven surface with slightly uneven color
1 ... Uneven surface with uneven color

Fisheyes

5 ... Nothing
4 ... Trace

3 ... Few
2 ... Many
1 ... Great many

INNER PHASE

5 ... Very thin cell wall with very good extensibility
4 ... A little thin cell wall with good extensibility
3 ... Slightly thin cell wall with slightly good extensibility
2 ... Slightly thick cell wall with slightly poor extensibility
1 ... Thick cell wall with poor extensibility

Taste-Flavor

5 ... Very good taste and flavor
4 ... Good taste and flavor
3 ... Slightly good taste and flavor
2 ... Slightly undesirable taste
1 ... Undesirable taste

Overall Evaluation

○ ... Above 3 marks in each item
× ... Including less than 3 marks in any item

TABLE 7

|  | Example 14 | Comparative Example 7 |
| --- | --- | --- |
| Weight (g) | 191 | 193 |
| Volume (cc) | 1105 | 1055 |
| Specific volume | 5.8 | 5.5 |
| Appearance of bread | 5 | 4 |
| Outer Phase | 5 | 3 |
| Fisheyes | 5 | 1 |
| Inner Phase | 4 | 2 |
| Taste · Flavor | 4 | 2 |
| Overall evaluation | ○ | × |

By using the dough conditioners of the present invention, breads can be prepared which have no fisheyes on the surface of the baked bread, have large bread volume and are good in all respects of appearance, inner phase, taste and flavor. The dough conditioners of the present invention are especially effective in the manufacture of the frozen and/or chilled dough using a lean bread formulation.

What is claimed is:

1. A breadmaking dough conditioner which comprises (a) an ascorbic acid, (b) at least one amino acid or salts thereof selected from the group consisting of cystine, methionine, asparagic acid, alanine, glycine and salts thereof, (c) an alum and (d) at least one emulsifier selected from the group consisting of a glycerol fatty acid monoester and a sucrose fatty acid ester having an HLB value of 5 to 10, wherein the weight ratio of (a):(b):(c):(d) is about 1–15; about 1–100:about 1–200:about $15 \times 10^2$–$80 \times 10^2$.

2. A wheat flour composition for breadmaking which comprises wheat flour and a dough conditioner comprising (a) an ascorbic acid, (b) at least one amino acid or salts thereof selected from the group consisting of cystine, methionine, asparagic acid, alanine, glycine and salts thereof, (c) an alum and (d) at least one emulsifier selected from the group consisting of a glycerol fatty acid monoester and a sucrose fatty acid ester having an HLB value of 5 to 10, wherein the weight ratio of (a):(b):(c):(d) is about 1–15; about 1–100:about 1–200:about $15 \times 10^2$–$80 \times 10^2$.

3. In a frozen or chilled bread dough, the improvement comprising a dough conditioner incorporated therein, the conditioner comprising (a) an ascorbic acid, (b) at least one amino acid or salts thereof from the group consisting of cystine, methionine, asparagic acid, alanine, glycine and salts thereof, (c) an alum and (d) at least one emulsifier selected from the group consisting of a glycerol fatty acid monoester and a sucrose fatty acid ester having an HLB value of 5 to 10, wherein the weight ratio of (a):(b):(c):(d) is about 1–15:about 1–100:about 1–200:about $15 \times 10^2$–$80 \times 10^2$.

4. A process of preparing a frozen or chilled bread dough which comprises the steps of incorporating into wheat flour, yeast and other ingredients for breadmaking a dough conditioner comprising (a) an ascorbic acid, (b) at least one amino acid or salts thereof from the group consisting of cystine, methionine, asparagic acid, alanine, glycine and salts thereof, (c) an alum and (d) at least one emulsifier selected from the group consisting of a glycerol fatty acid monoester and a sucrose fatty acid ester having an HLB value of 5 to 10, wherein the weight ratio of (a):(b):(c):(d) is about 1–15:about 1–100:about 1–200:about $15 \times 10^2$–$80 \times 10^2$.

5. A process of claim 4 which further comprises the steps of first fermentation, dividing and molding.

* * * * *